United States Patent
Hatzav et al.

(10) Patent No.: US 7,823,773 B2
(45) Date of Patent: Nov. 2, 2010

(54) SYSTEM AND METHOD FOR CREATING A BADGE FOR A CONFERENCE OR EXHIBITION VISITOR FROM A SCANNED ID DOCUMENT

(75) Inventors: Iuval Hatzav, Los Angeles, CA (US); Ilan Ben-Shahar, Beer-Sheva (IL); Giyora Sharaby, Moshav Neve Yarak (IL); Daniel Hatzav, Hod Hasharon (IL)

(73) Assignee: CSSN Inc. Catco Scanning Solutions, Culver City ( * ) Notice: Subject to any disclaimer, the term of this patent is extended or adjusted under 35 U.S.C. 154(b) by 558 days.

(21) Appl. No.: 11/552,994

(22) Filed: Oct. 26, 2006

(65) Prior Publication Data

US 2007/0181664 A1    Aug. 9, 2007

Related U.S. Application Data

(60) Provisional application No. 60/763,455, filed on Jan. 31, 2006.

(51) Int. Cl.
*G06K 5/00* (2006.01)
(52) U.S. Cl. ............. 235/380; 235/375; 235/382; 235/451; 235/492
(58) Field of Classification Search ............. 235/375, 235/380, 382, 451, 492; 340/572.8, 573.1
See application file for complete search history.

(56) References Cited

U.S. PATENT DOCUMENTS

| | | | | |
|---|---|---|---|---|
| 5,180,906 | A * | 1/1993 | Yamada | 235/487 |
| 5,913,542 | A * | 6/1999 | Belucci et al. | 283/75 |
| 6,394,356 | B1 * | 5/2002 | Zagami | 235/487 |
| 6,867,683 | B2 * | 3/2005 | Calvesio et al. | 340/5.52 |
| 7,738,743 | B2 * | 6/2010 | Hino | 382/306 |
| 2002/0140660 | A1 * | 10/2002 | Sato et al. | 345/94 |
| 2003/0137682 | A1 * | 7/2003 | Sakai et al. | 358/1.13 |
| 2003/0223637 | A1 * | 12/2003 | Simske et al. | 382/176 |
| 2004/0099731 | A1 * | 5/2004 | Olenick et al. | 235/380 |
| 2004/0153649 | A1 * | 8/2004 | Rhoads et al. | 713/176 |
| 2005/0284931 | A1 * | 12/2005 | Adams et al. | 235/382 |
| 2006/0026140 | A1 * | 2/2006 | King et al. | 707/3 |
| 2006/0087410 | A1 * | 4/2006 | Garcia et al. | 340/309.16 |

* cited by examiner

*Primary Examiner*—Thien M. Le
*Assistant Examiner*—Tuyen K Vo

(57) ABSTRACT

A system and method for acquiring identification information from each visitor of an event and producing a smart badge that will automatically register him to the event activities. The system comprises a scanning or imaging device, information extraction means and printing means, including label printing and RFID, magnetic and barcode printing means. The system can also read each smart badge issued by wireless means and without the visitor having to actively cooperate and hence, continuously trace any visitor location and his points of interest.

15 Claims, 2 Drawing Sheets

SYSTEM AND METHOD FOR CREATING A BADGE FOR A CONFERENCE OR EXHIBITION VISITOR FROM A SCANNED ID DOCUMENT

CROSS-REFERENCE TO RELATED APPLICATIONS

This application claims the benefit under 35 USC 119(e) from U.S. provisional application 60/763,455 filed Jan. 31, 2006, the disclosure of which is included herein by reference.

This application is related to the following U.S. patent applications:

"System for extracting information from an identity card", application Ser. No. 10/959,261, filed Oct. 6, 2004; and "System and method for scanning a business card from within ms outlook directly into the ms outlook contact file", application Ser. No. 11/307,943 filed Feb. 28, 2006.

The disclosures of the above applications are incorporated herein by reference.

FIELD OF THE INVENTION

The present invention relates to systems and methods for scanning identification documents, especially to a system that can scan an identification document such as a business card, ID card, passport and the like and automatically produce a visitor badge and/or event ID.

BACKGROUND OF THE INVENTION

Today, organizers of events such as conventions, conferences, exhibitions, amusement parks, building complex and the like, require manning an event reception(s) that will orderly register each visitor. Such registration requires obtaining and verifying the visitor's ID and produces an individual printed badge. The badge then serve as an identification means at each site he visits and simplify the process of exchanging digital information. The badge can also serve as a means for the event organizers to collect information about his interests, for future marketing purposes.

This then requires a manual registration process at the event entrance. It also requires the visitor to present his badge at each site or station, which he often fails to do.

It is thus desirable to automate this procedure and have a system that will be able to easily acquire identification information from each visitor and produce a badge that will automatically register him at each site he visits, without the need for a manual reception of the visitor and without having him to present himself at each site stations or do any other activity.

SUMMARY OF THE INVENTION

In view of the limitations now present in the prior art, the present invention provides a new and useful system that can significantly simplify the process of converting IDs into a functional visitor badge. The badge will be printed without any needs of human intervention.

The object of the present invention is then to provide a system that can easily acquire identification information from each visitor of an event and produce a badge that will automatically register him at each site of the event he visits, without having him to present himself at each such site or do any other activity.

It is an object of the present invention to provide a system that can scan such identification documents such as business cards, driver's license, other ID cards, passports and the like, and extract that information into a data processing machine.

It is an object of the present invention to provide a system that can take the extracted identification information and print badge labels containing part or all of that information.

It is an object of the present invention to provide a system that can take the extracted identification information and produce a smart badge that containing part or all of that information. Such a badge can be an RFID badge, magnetic cards, barcode badge, electromagnetic cards, or any other smart card known in the art.

It is an object of the present invention to provide a system that can read each smart badge issued by wireless means and without the visitor having to actively cooperate. The system can continuously trace any visitor location and his points of interest.

According to the teachings of the present invention, there is provided a system for scanning an identification document and automatically producing a visitor badge and/or event ID, comprising: (a) a data acquisition apparatus for extracting data from an Identification (ID) data document; (b) an application program running on a data processing unit or an embedded stand alone apparatus; and (c) badge printing means, whereas said system is capable of reading the ID data document, extracting the textual and image data from the said ID data document and printing said badge including conventional, electronic, RFID, one or two dimensional barcodes and magnetic printing. The system of the present invention may further comprise one or more of the following: (d) a label printer and (e) readers that can also read said badge from a distance.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are given by way of illustration only and thus not limitative of the present invention, and wherein.

DETAILED DESCRIPTION OF THE INVENTION

Figure 1:
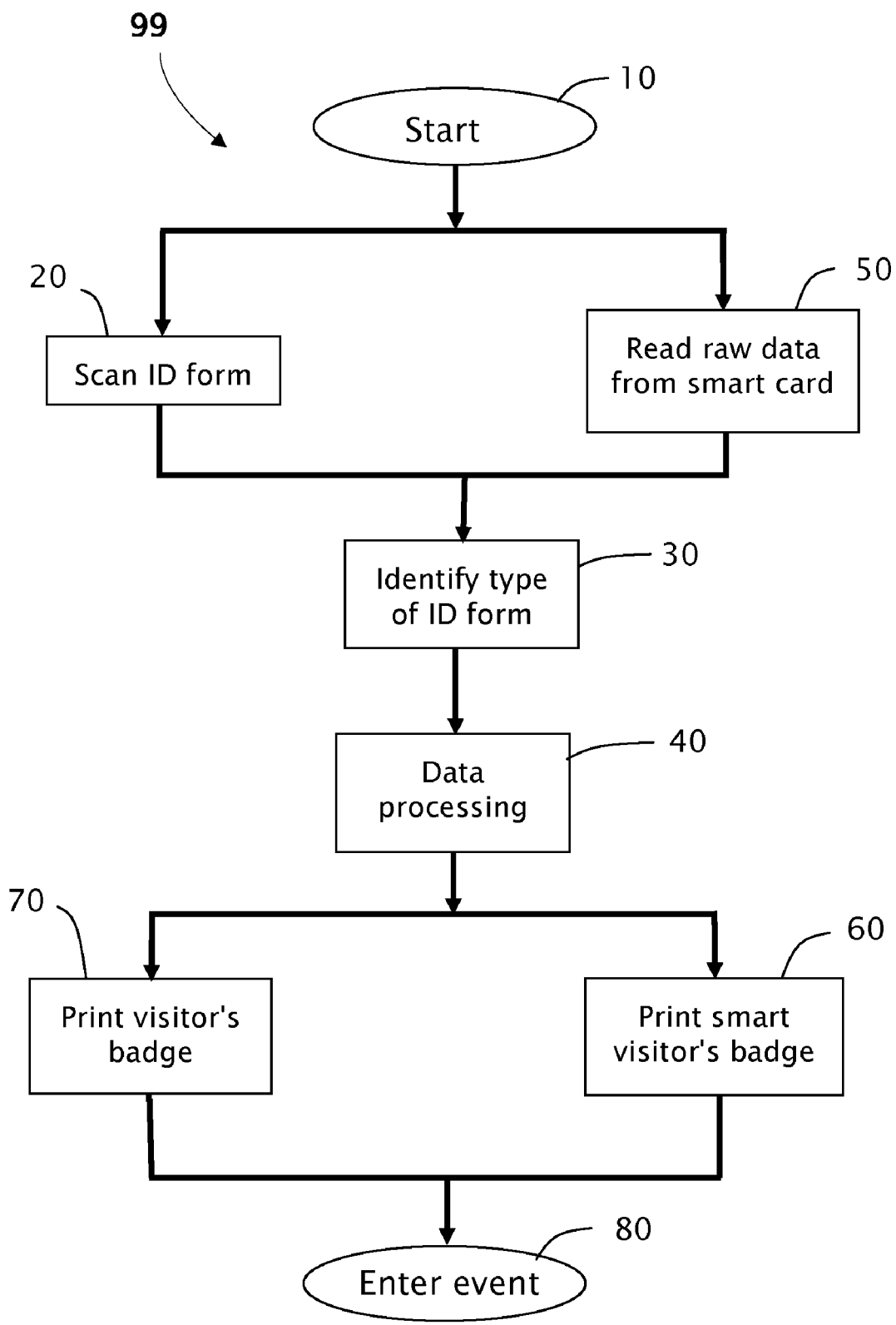
FIG. 1 is a schematic block diagram, exemplifying a method for scanning an identification document and automatically producing a visitor badge and/or event ID, according to an embodiment of the present invention.

Before explaining at least one embodiment of the invention in detail, it is to be understood that the invention is not limited in its application to the details of construction and the arrangement of the components set forth in the following description or illustrated in the drawings.

The main object of the present invention is then to provide a system that can easily acquire identification information from each visitor of an event and produce a badge that will automatically register him to the event activities. The system can also read each smart badge issued by wireless means and without the visitor having to actively cooperate and hence, continuously trace any visitor location and his points of interest.

FIG. 1 shows the schematic block diagram exemplifying a method 99 for scanning an identification document such as a business card, ID card, passport and the like and automatically producing a visitor badge and/or event ID, according to an embodiment of the present invention. When a visitor arrives at an event or location with multiple stations such as conventions, conferences, exhibitions, amusement parks and the like, an automatic system according to the present invention, will await for him at the event reception. The system will register him and provide him with the event badge with his personal details. The visitor's will present 10 the system with some kind of identification such as a business card, driver's license, passport and so on and so forth.

Figure 2:
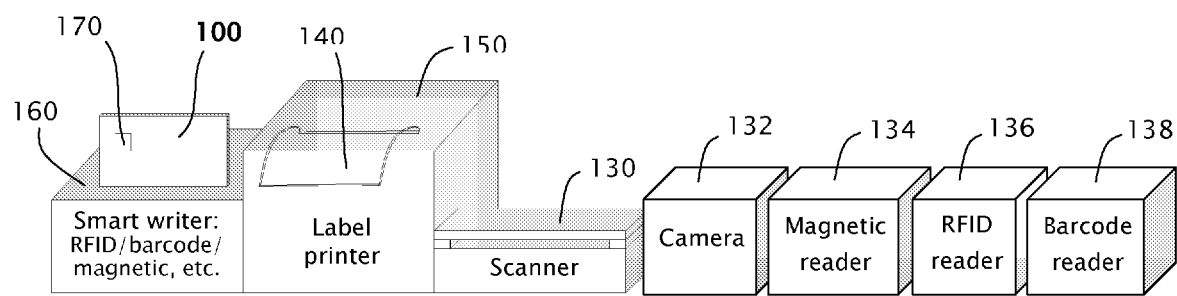
FIG. 2 depicts an example of the components comprising the system for scanning an identification document and automatically producing a visitor badge and/or event ID, according to an embodiment of the present invention.

FIG. 2 exemplify the basic components that the present invention comprises: a scanner 130 that reads the data of the visitor's ID form, a smart badge printer 160 that will enable the visitor to move about the event location and optionally, a label printer 150 with identification data that he can attach to the smart badge 100. Instead of scanner 130 or in addition to it the data acquisition unit can also be a camera 132 and/or a magnetic reader 134, and/or an RFID reader 136 and/or a barcode reader 138 or any other media reader known in the art. The smart badge printer 160, which will enable the visitor to move about the event points of interest, may write on the smart badge 100 magnetic data, and/or to the RFID and/or one or two dimensional barcode data or any other data types known in the art.

Referring back to FIG. 1, the system is facilitated to acquire (20) data from the ID form presented to the system, and thereby to obtain all available information from said ID form, such as the visitor's first name, family name, titles, address, phone numbers, Email address, picture, one or two dimensional barcode information, and so on and so forth.

The data processing unit 40 is capable of differentiating text from image data, and to extract textual data using tools such as OCR. Before extracting the actual information the system can do an initial scan to identify 30 the type of ID presented to it. The data processing unit 40 can be a personal computer, a PDA, an embedded processor and so on and so forth.

Said extracted information can than be stored on the designated data processor 40. The data is processed and a smart badge 100 identifying the visitor is printed 60 and issued to the visitor for him to wear (along with to carry the badge 100). The system can also print 70 a label 140 with the visitor's pre selected relevant information (if available), such as his name, title, picture, company name and so on. The label 140 may also contain a barcode such as a 2-dimensional barcode PDF417. The visitor is now set to enter 80 the event without having to go through a receptionist and a registration process, as tediously as it may be. The whole process of issuing a smart badge 100 can take seconds. In its simplest form the badge 100 only carries the printed label 140.

The smart badge 100 can contain an RFID 170 set ahead of time and/or a magnetic ID set ahead of time and/or a 2-dimensional barcode ID and/or any other media for data storage means known in the art. That ID is read 50 by an appropriate reader and then coupled to the visitor's extracted ID data.

That ID data can be read by the appropriate reader located at designated locations throughout the event, such as various booths in an exhibition. The visitor's track and points of interests can be traced and stored in a server for future use.

At this point the visitor can wonder about the event defined area to his liking. When he approaches a designated location such as various booths in an exhibition, the system reads his smart badge 100 by wireless means and without the visitor having to actively cooperate and hence, continuously trace any visitor location and his points of interest. The smart badge 100 can be read by RFID readers, magnetic readers and/or by 2-dimensional barcode readers, etc.

The badge serves as an identification means at each site he visits and simplifies the process of exchanging digital information. The badge can also serve as a means for the event organizers to collect information about his interests, for future marketing purposes. The event organizers can classify the extracted data of each visitor according to his points of interest, which locations he visited and how much time he spent at each such location.

Embodiments of the present invention can be implemented in various combinations:

a) All readers can be combined into one device.

b) Each reader type is an individual device.

c) Any reader combination combing one or more readers per device.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A system, having a data processing unit and a printer, for automatically producing a badge for a visitor to an event, comprising:

a) a camera configured to acquire at least one image of at least a portion of an identification document of said visitor; and b) an application program running on said data processing unit, configured to extract textual data from said at least one acquired image, wherein said data processing unit is facilitated to acquire selected personal data from said extracted textual data;

wherein said data processing unit is coupled to operate said printer to print at least a portion of said selected personal data onto said badge or onto a label carried by said badge; and wherein upon activation of the system, the system produces said badge with no further interaction between the operator of the system and the system.

2. The system as in claim 1, wherein said data processing unit is a personal computer or a PDA.

3. The system as in claim 1, wherein said data processing unit is embedded in said data acquisition apparatus or in said printer.

4. The system as in claim 1, wherein said badge includes one or more of the following media for holding providable data: RFID, 2-dimensional barcode, magnetic field, electromagnetic field.

5. The system as in claim 1, wherein said identification document is one or more of the following documents: a business card, a driver's license, a passport, a commonly used identification document.

6. The system as in claim 1, wherein said application program running on said data processing unit is configured to further extract image data from said at least one acquired image.

7. The system as in claim 6, wherein said data processing unit is coupled to operate said printer to print at least a portion of said extracted image data onto said badge or onto said label carried by said badge.

8. The system as in claim 1, wherein said data processing unit includes an OCR module for extracting said extracted textual data from said at least one acquired image.

9. The system as in claim 1 further comprising a non-image data acquisition apparatus for reading textual data from said identification document, thereby creating scanned textual data, wherein said data processing unit authenticates said extracted textual data with said scanned textual data.

10. The system as in claim 9, wherein said non-image data acquisition apparatus is one or more of the following devices: a magnetic card reader, a 2-dimensional barcode reader, a RFID reader.

11. In a system having a processing unit, a printer, memory and a camera, the camera configured to acquire at least one image of an identification document, a method for automatically producing a badge for a visitor to an event, the method comprising the steps of:
   a) acquiring at least one image of said identification document by said camera;
   b) storing said at least one acquired image in said memory;
   c) extracting textual data from said at least one acquired image by said data processing unit;
   d) obtaining personal data from said extracted textual data;
   (e) selecting at least a portion of said personal data; and
   (f) printing said selected personal data onto said badge or onto a label carried by said badge, including using conventional, electronic or magnetic printing.

12. The method as in claim 11, wherein said extracting of textual data from said at least one acquired image includes OCR analysis.

13. The method as in claim 11, wherein said identification document is one or more of the following documents: a business card, a driver's license, a passport, a commonly used identification document.

14. The method as in claim 11 further comprising the step of extracting image data from said at least one acquired image by said data processing unit.

15. The method as in claim 14 further comprising the step of printing at least a portion of said extracted image data onto said badge or onto a label carried by said badge, including using conventional, electronic or magnetic printing.

* * * * *